United States Patent [19]
Markham

[11] Patent Number: 5,611,918
[45] Date of Patent: Mar. 18, 1997

[54] ELECTRONIC DRIVER FOR WATER TREATMENT SYSTEM UV BULB

[75] Inventor: Ronald C. Markham, Kentwood, Mich.

[73] Assignee: Amway Corporation, Ada, Mich.

[21] Appl. No.: 510,426

[22] Filed: Aug. 2, 1995

[51] Int. Cl.$^6$ .................................................. C02F 1/32
[52] U.S. Cl. .......................... 210/87; 210/192; 250/435; 307/117; 340/606; 427/105; 427/186.3
[58] Field of Search ............................. 250/432 R, 435, 250/436; 422/24, 186.3, 105; 210/85, 87, 143, 192, 243, 748; 307/117, 118; 315/129, 276, 277, DIG. 7, 354, 279, 287, 299, 307; 340/606

[56] References Cited

U.S. PATENT DOCUMENTS

| 3,201,645 | 8/1965 | Strecker | 315/279 |
| 4,676,896 | 6/1987 | Norton | 210/192 |
| 4,859,914 | 8/1989 | Summa | 315/DIG. 7 |
| 5,171,431 | 12/1992 | Schulte | 210/243 |
| 5,230,792 | 7/1993 | Sauska et al. | 210/97 |
| 5,324,423 | 6/1994 | Markham | 210/87 |
| 5,401,394 | 3/1995 | Markham | 210/85 |
| 5,434,478 | 7/1995 | Kovalsky et al. | 315/DIG. 7 |
| 5,487,088 | 1/1996 | Weltz et al. | 315/DIG. 7 |
| 5,498,931 | 3/1996 | Bedocs | 307/117 |
| 5,519,289 | 5/1996 | Katyl et al. | 315/DIG. 7 |
| 5,547,590 | 8/1996 | Szabo | 210/748 |

Primary Examiner—Joseph W. Drodge
Attorney, Agent, or Firm—Warner Norcross & Judd

[57] ABSTRACT

A driver or ballast for the ultraviolet bulb of a water treatment system. The driver includes a step-up transformer and a feedback oscillator connected between the secondary and the primary of the transformer. The secondary of the transformer also is selectably connected through one of two different capacitor compensators depending on water flow through the system. In a low intensity mode, the current and the power factor output of the driver are relatively low—preferably just enough to keep the bulb filaments energized. In a high intensity mode, the current and the power factor are relatively high to power the bulb at a relatively high efficiency. The driver operates at a relatively low DC voltage. A voltage converter selected as function of the local line voltage converts the AC line voltage to the necessary DC voltage.

11 Claims, 2 Drawing Sheets

5,611,918

ELECTRONIC DRIVER FOR WATER TREATMENT SYSTEM UV BULB

BACKGROUND OF THE INVENTION

The present invention relates to water treatment systems, and more particularly to an electronic driver or ballast for an ultraviolet household water treatment system.

Household water treatment systems have gained widespread popularity, particularly in areas with less-than-ideal potable water. A household system or unit is mounted on a single tap to selectively treat water flowing through the tap. Treatment may include filtration, irradiation, or both. The most effective water treatment systems include ultraviolet (UV) irradiation to sterilize the water stream. It is well known that such UV treatment kills bacteria and viruses with an extremely high degree of reliability. The water to be treated is routed through a container, and a UV light source within or adjacent to the container directs UV light through the water stream.

A first issue with UV water treatment systems relates to intensity control of the UV bulb. At least three factors are considered in determining the intensity of the UV light. First, it is desirable to operate the bulb at a relatively high intensity to achieve the maximum "kill rate" when water is flowing. Second, it is desirable to never extinguish the bulb, for example as one might be tempted to do when water flow stops, because of the start-up lag in bringing the UV intensity back up to treatment intensity when water flow is detected. Third, it is desirable to reduce bulb wattage or power when water flow stops to avoid excessive warming of the water "stagnated" within the treatment chamber.

Prior artisans have accommodated these considerations by designing bulb intensity control circuits capable of selectively driving the bulb at relatively high and low intensities. One such circuit is illustrated in U.S. Pat. No. 5,324,423 issued Jun. 28, 1994, to Markham and entitled UV BULB INTENSITY CONTROL FOR WATER TREATMENT SYSTEM. When water is flowing, as detected by a flow switch, the bulb is operated at high intensity to achieve the desired kill rate. When water flow stops, the bulb is operated at a lower intensity to avoid excessive warming of the water and to prevent extinguishing of the bulb. While the Markham circuit is a significant advance in the art, it is not without its drawbacks. The inductive ballast is more expensive and less efficient than desired. Further, the ballast is relatively heavy and noisy.

A second issue with water treatment systems is the possibility of electrical shock to a user. While the risk is low, the consequences can be serious because the systems plug directly into the household line voltage, which is 110 volts in the United States and varies from 100 volts to 264 volts throughout the world.

A third issue with water treatment systems is the variance in design from country to country. As noted in the preceding paragraph, line voltage can vary from 100 volts to 264 volts. Additionally, line frequency varies from 50 Hz to 60 Hz. Consequently, the electronics package of a water treatment system must be custom tailored to the line voltage/frequency combination for that country. This leads to design, manufacture, and inventory problems.

SUMMARY OF THE INVENTION

The aforementioned problems are overcome in the present invention providing a UV water treatment system having improved intensity control and a uniform electrical/electronics design.

In a first aspect of the invention, an electronic driver, rather than an inductive ballast, operates the ultraviolet bulb at two distinct intensities depending on water flow. More specifically, the control circuit includes a step-up transformer having a primary and secondary. A feedback oscillator is connected between the secondary and the primary. Additionally, the secondary goes through one of two capacitances depending on water flow. When water flow is not detected, the lower capacitance is electrically connected to provide reduced current and power factor to the bulb. When water flow is detected, the higher capacitance is electrically connected to drive the bulb at full intensity.

The advantages of the first aspect are numerous. First, the bulb filaments remain excited even in the low intensity mode, permitting rapid reintensification upon the detection of water flow. Second, switching from low intensity to high intensity is virtually instantaneous. Third, the cost is lower than prior art circuits. Fourth, the operation is more efficient. Fifth, the relatively heavy and noisy inductive ballast of the prior art is eliminated.

In a second aspect of the invention, the bulb control circuit is designed to be powered by a low, standard, DC voltage, which in the preferred embodiment is 12 volts. A DC voltage converter unique to the applicable line voltage/frequency combination is provided to convert local line AC voltage to the standard DC voltage.

The advantages of this second aspect also are numerous. First, the electronics package within the water treatment system can remain the same regardless of the line voltage/frequency. Only the DC voltage converter is different depending on the line voltage/frequency. Second, and consequently, design is standardized; manufacture is standardized; and inventories are reduced. Third, the risk of serious electrical shock is vastly reduced. Fourth, local electrical code approval is required only for the voltage converter and not for the treatment system itself.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 2:
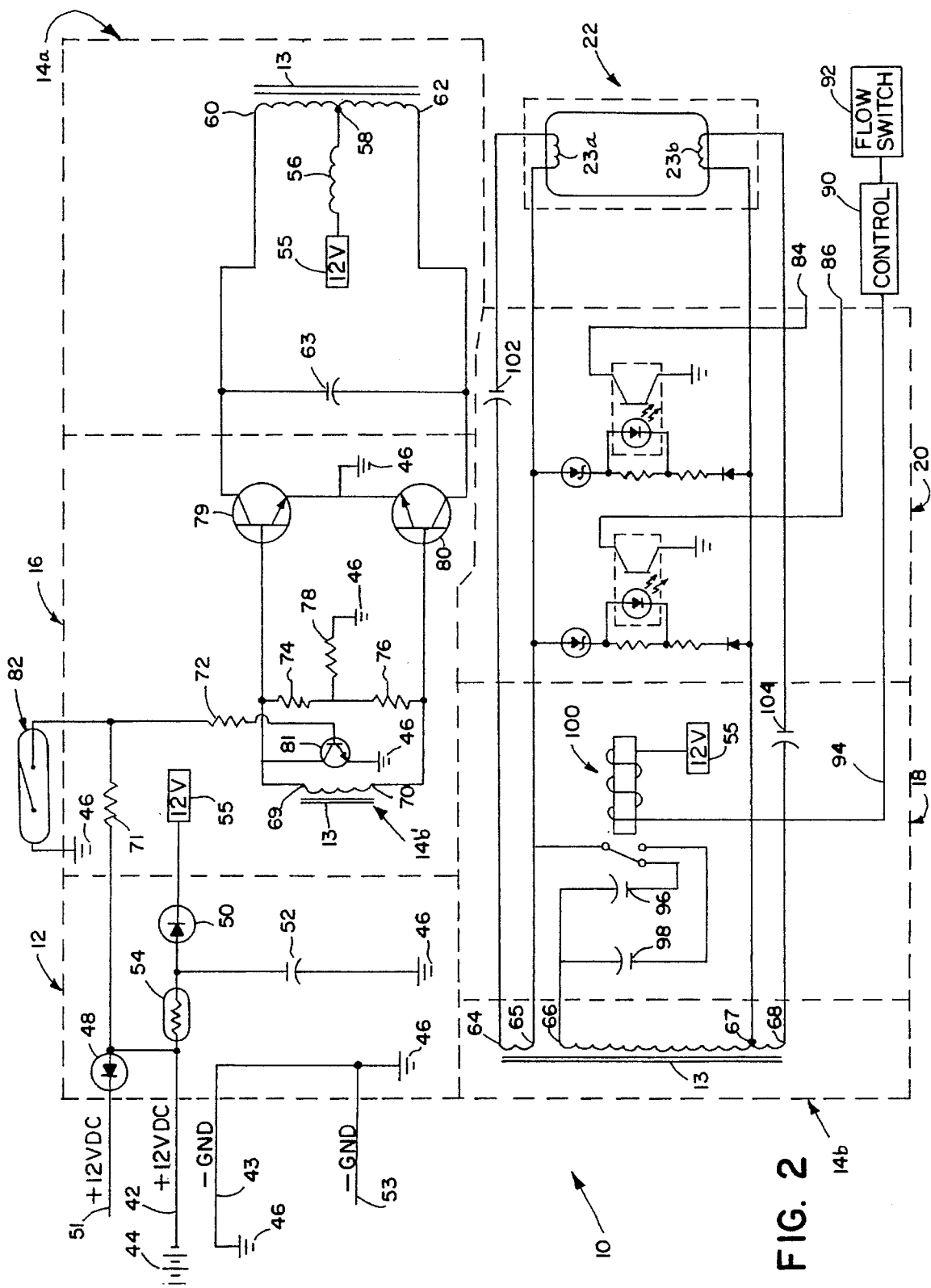
FIG. 2 is a schematic circuit diagram of the electronic driver.

The ultraviolet (UV) electronic driver of the present invention is illustrated in FIG. 2 and generally designated 10. The system includes a power conditioning circuit 12; a step-up transformer including a core 13, a primary circuit 14a, and a secondary 14b; a feedback oscillator 16; a capacitance circuit 18; and a voltage monitor 20. The control circuit 10 is connected to the UV bulb 22 to drive the bulb at two separate intensities. The bulb is driven at a relatively low intensity when water flow has stopped to prevent undesirable temperature rise in the stagnated water. The bulb 22 is driven at a relatively high intensity when water flow is detected to provide maximum kill rate.

Figure 1:
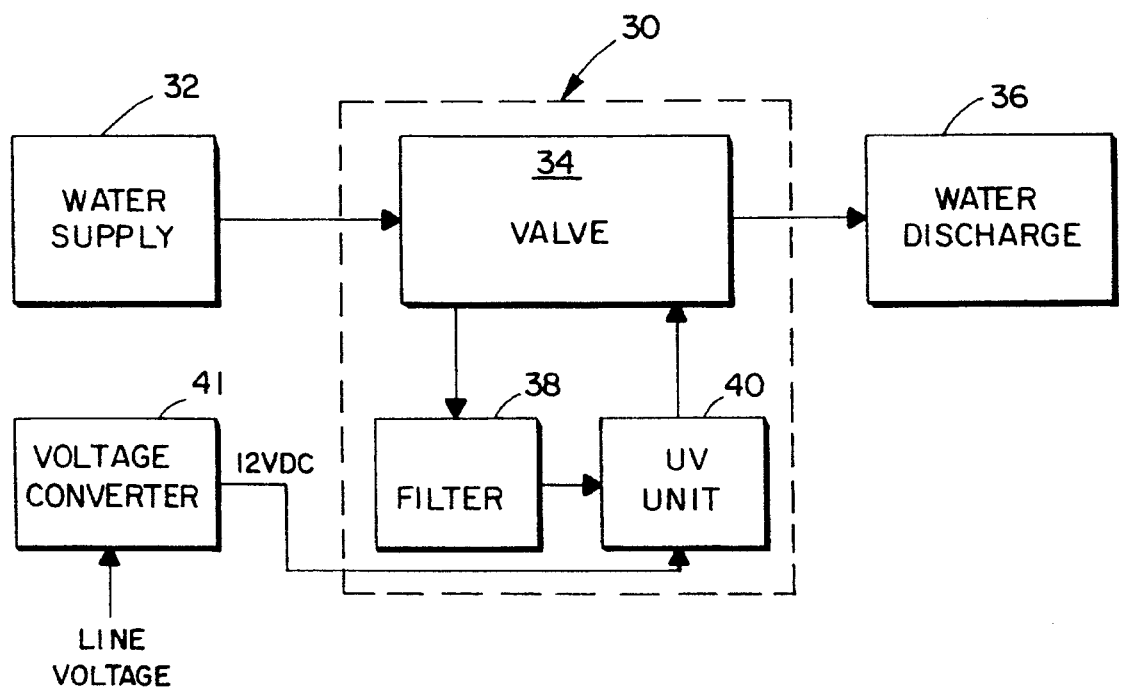
FIG. 1 is a block diagram of a water treatment system in which the UV electronic driver of the present invention may be used.

Turning to FIG. 1, the electronic driver 10 is included in a water treatment system of the type schematically illustrated in FIG. 1 and generally designated 30. The line connections illustrated between and within the blocks 30, 32, and 36 are fluid connections permitting water flow through the treatment system 30. Generally speaking, the water treatment system is connected to a potable water supply 32 and includes a valve 34 for selectively routing water either directly to the tap discharge 36 or to the filter and sterilization units 38 and 40. The valve may be of the type illustrated in U.S. Pat. No. 5,279,329 issued Jan. 18, 1994, to Pippel and entitled FAUCET DIVERTER VALVE.

In the water treatment system 30, the water can be sent directly to the tap discharge 36 by putting the valve 34 in a first manually selected position. Alternatively, the valve can be placed in a second manually selected position where the water is routed sequentially through the filter 38 and the sterilization unit 40 before being discharged from the tap at 36. The tap can include two discharges-one for treated water and a second for untreated water. The filter 38 is preferably a carbon-activated filter. The UV sterilization unit includes a water chamber, container, or passageway in conjunction with the ultraviolet (I/V) source of light 22 for sterilizing water flowing therethrough. Treatment systems of the type illustrated in FIG. 1 are generally well known to those having ordinary skill in the art.

The UV unit 40 within the treatment system 30 receives power from the voltage converter 41. The voltage converter is of conventional design and construction generally well known to those skilled in the art. The particulars of the converter will depend on the voltage and frequency of the AC line voltage. The converter is selected to convert the AC line voltage to 12 volts DC to power the UV unit 40. This design and construction (1) permits the electronics package within the system to remain the same, with only the converter changing from locale to locale depending on the line voltage; (2) reduces the risk of serious electrical shock to the user; (3) requires local electrical code approval typically only for the converter; (4) reduces inventory; and (5) accommodates possible future battery back-up.

Figure 3:
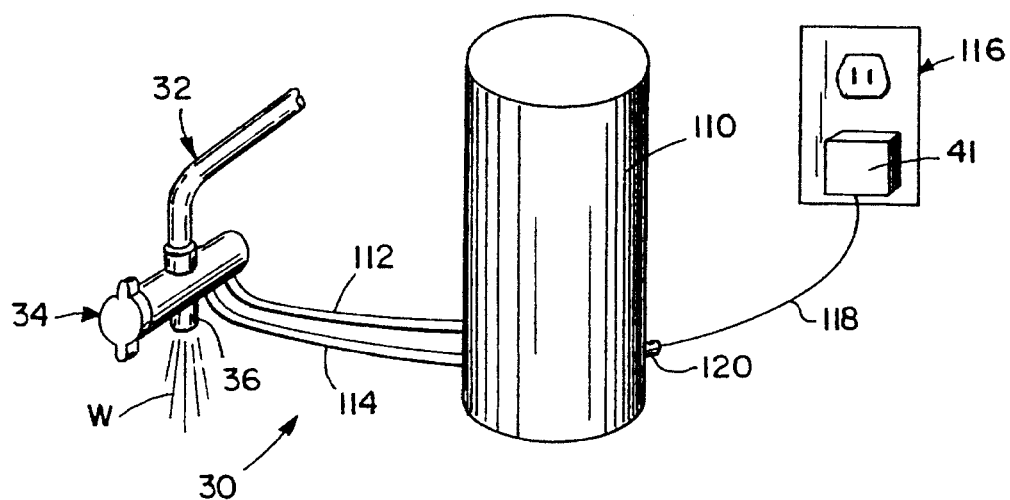
FIG. 3 is a schematic illustration of the physical components of the water treatment system.

The FIG. 1 components also are schematically physically illustrated in FIG. 3. The housing 110 is a counter-top item that encloses the filter 38 and the UV unit 40 illustrated in FIG. 1. The valve 34 is connected to the tap or other water supply 32 and also is connected to the housing by hoses or lines 112 and 114. Water W is shown exiting the discharge 36. The voltage converter 41 is plugged into a line voltage electrical outlet 116. A power line 118 delivers the 12-volt DC power to system electronics. A plug 120 on line 118 connects to the housing 110.

Returning to FIG. 2, the power conditioning circuit 12 is generally conventional and is selected to interface the driver 10 with a 12-volt DC power supply, such as the voltage converter 41. More specifically, the lines 42 and 43 connect to the 12-volt supply 44 and the ground 46, respectively. The signal conditioning circuit 12 includes a diode 50/capacitor 52 pair connected between the 12-volt source and ground. The conditioned 12-volt voltage is denominated 55 and is supplied to other components, for example, a main circuit board (not shown) in the control 90 via lines 51 and 53. A diode 48 is located in the line 51. Diodes 48 and 50 prevent damage to the circuit in the case of an accidental reverse power connection.

Additionally, a positive temperature coefficient (PTC) resistor 54 is included to protect the circuit 10 from excessive power dissipation. As the bulb 22 ages, the voltage required to maintain the plasma-column across the filaments 23 alive or active increases. This increased voltage requirement draws more current from the power supply 44 and consequently through the PTC resistor 54. The PTC resistor opens up when the current draw exceeds a design parameter so as to protect the power supply 44 and the circuit 10.

The step-up transformer includes the core 13, the primary 14a, and the secondaries 14b and 14b'. The primary 14a includes two taps 60 and 62. The primary 14a is center tapped between taps 60 and 62, and the 12-volt source 55 is connected through the inductor 56 to the center tap 58. Capacitor 63 is electrically connected between the taps 60 and 62. The secondary 14b includes taps 64, 65, 66, 67, and 68. A portion of the secondary denominated 14b' is illustrated within the oscillator circuit 16 and includes taps 69 and 70.

The oscillator circuit 16 is electrically connected between the secondary 14b' and the primary 14a. A pair of resistors 74 and 76 are connected in series across the taps 69 and 70. A resistor 78 electrically connects both resistors 74 and 76 to ground 46. A pair of transistors 79 and 80 have bases electrically connected to the resistors 74 and 76, respectively. The collector of transistor 79 is electrically connected to tap 60, and the collector of transistor 80 is electrically connected to the tap 62. The emitters of the transistors 79 and 80 are electrically connected together to ground 46. Capacitor 64 and/or resistors 74 and 76 can be adjusted to change the oscillator frequency.

The oscillator 16 is a feedback oscillator of push/pull design. The transformer provides inductive feedback. The voltage across the secondary 14b' between taps 69 and 70 is used to drive the primary 14a. In the preferred embodiment, the oscillator drives the primary at a frequency of 23,200 Hz in the high-intensity mode and 35,700 Hz in the low-intensity mode. Preferably the frequencies are selected to optimize the efficiency of the bulb 22, and the frequencies will vary depending on the application. In the high mode, both the current and the power factor are relatively high. In the low mode, both the current and the power factor are relatively low-preferably just enough to keep the plasma arc column between the filaments 23 energized. The current can be easily adjusted by changing either or both of the capacitors 96 (high mode) and 98 (low mode).

A transistor 81 is electrically connected in series between the tap 69 and the ground 46. The base of the transistor 81 receives unconditioned voltage through resistors 71 and 72. When the system is operating normally, the transistor 81 is nonconductive and therefore does not impact the oscillator 16. A magnetic reed switch 82 is electrically connected in series between the ground 46 and the junction of the resistors 71 and 72. The switch 82 is mounted in the water treatment system 30 as is generally known so that it is closed when the bulb 22 is physically shrouded and open when the bulb is not shrouded. For example, the switch typically is mounted to be actuated by the physical presence or absence of a shroud or cover over the bulb 22. If the switch 82 is open, indicating that the shroud is not present, voltage is supplied to the base of the transistor 81; and consequently the transistor grounds the base of the oscillator transistor 81 in the circuit 16. This results in the bulb not being lit. This feature prevents human eyes from being damaged by inadvertent UV irradiation.

Although a feedback transformer oscillator with capacitor compensation has been described, it will be readily appreciated that many other oscillators could be used. Suitable alternatives include feedback transformer oscillators, feedback amplifier oscillators, and oscillators implemented using integrated circuits (e.g. a 555 timer), transistors, crystals, or ceramic resonators.

The voltage monitor circuit 20 is illustrated and described in co-pending application Ser. No. 002,820 filed Jan. 11, 1993, by Markham and entitled WATER TREATMENT SYSTEM ULTRAVIOLET VOLTAGE MONITOR CIRCUIT. Suffice it to say that the monitor circuit 20 provides output signals on lines 84 and 86 indicating if the bulb is out, the ballast is out, or both are functioning properly. The signals can be used by the control 90 to illuminate indicator lights, sound alarms, or otherwise provide information to the user.

The control 90 is connected to a flow switch 92. The flow switch can be one of any number generally known in the art. The flow switch of the present invention simply indicates whether water is flowing or not. Other flow switches indicating the relative volume of flow may be used.

The capacitance circuit 18 is connected to the control 90 via line 94. The capacitance circuit includes a capacitor 96 of relatively high capacitance, a capacitor 98 of relatively low capacitance, and a solenoid switch 100 powered by the conditioned voltage. Both of the capacitors 96 and 98 are electrically connected between the tap 66 and the solenoid 100. Depending upon the position of the relay, the capacitors 96 and 98 are connected between the secondary 14b and the bulb 22. Other capacitor circuits providing different capacitances may be substituted.

The bulb 22 is conventional in the art and includes a pair of filaments 23a and 23b. The filament 23a is electrically connected to the secondary taps 64 and 65; and the filament 23b is electrically connected to the secondary taps 67 and 68. Capacitors 102 and 104 are included within the connections. The described connections keep the filaments heated and excited and therefore in a condition to more rapidly supply the electrons needed in the high-intensity state when the driver switches to the high intensity mode.

Operation

The default position of the relay 100 is as illustrated in FIG. 2 so that the capacitor 96 is electrically connected between the secondary 66 and the bulb 22. The high capacitance of capacitor 96 operates the bulb 22 in the high-intensity mode. This mode is selected as the default position to insure irradiation of all water-both flowing and stagnant—even upon failure of the control 90 or the switch 92.

A fixed time after no water flow is detected by the switch 92, the control 90 sinks voltage through the line 94, which activates the solenoid 100. This causes the solenoid be activated to its unnatural state (low mode), disconnecting capacitor 96 and connecting capacitor 98 between the secondary 14b and the bulb 22. The relatively low capacitance operates the bulb at a greatly reduced intensity and power.

The present invention therefore provides an effective, simple, inexpensive circuit for controlling bulb intensity and power without sacrificing bulb life. The electronic driver also eliminates the need for a relatively heavy and noisy inductive ballast and a relatively unreliable starter.

The above description is that of a preferred embodiment of the invention. Various alternations and changes can be made without departing from the spirit and broader aspects of the invention as set forth in the appended claims, which are to be interpreted in accordance with the principals of patent law including the doctrine of equivalents.

The embodiments of the invention in which an exclusive property or privilege is claimed are defined as follows:

1. A driver system for an ultraviolet bulb in a water treatment system comprising: a flow switch operative for detecting fluid flow,
   a step-up transformer including a primary and a secondary;
   an oscillator operative for controlling the electrical power supplied to said primary of said transformer; and
   an oscillator control means responsive to the flow switch for controlling the frequency at which said oscillator operates, said oscillator control means driving said oscillator at a first frequency when water is not flowing and at a second frequency when water is flowing.

2. A driver system for an ultraviolet bulb in a water treatment system comprising:
   a flow switch operative for detecting fluid flow,
   a step-up transformer including a primary and a secondary;
   an oscillator operative for controlling the electrical power supplied to said primary of said transformer, said oscillator comprising a feedback oscillator electrically connected between said secondary and said primary of said transformer; and
   an oscillator control means responsive to the flow switch for controlling the frequency at which said oscillator operates, said oscillator control means driving said oscillator at a first frequency when water is not flowing and at a second frequency when water is flowing, said oscillator control means comprising variable capacitance compensation means electrically connected between said secondary of said transformer and the bulb, said compensation means being responsive to the flow switch for providing a first capacitance compensation to the bulb when water is not flowing and for providing a second capacitance compensation to the bulb when water is flowing.

3. A driver as defined in claim 2 wherein said compensation means includes a pair of capacitors and switch means responsive to the flow switch for selectably connecting one of said capacitors to said secondary.

4. A driver as defined in claim 2 wherein said transformer is a center-tap transformer.

5. A water treatment system comprising:
   an ultraviolet bulb;
   water flow switch means for providing a signal indicative of whether water is flowing through said system;
   a transformer having a primary adapted to be electrically connected to a power supply and a secondary electrically connected to said bulb;
   an oscillator electrically connected to said transformer primary; and
   a control means for controlling the frequency at which said oscillator operates, said control means operating said oscillator at a first frequency when said water flow switch means signal indicates that water is not flowing, said control means operating said oscillator at a second frequency when said water flow switch means signal indicates that water is flowing.

6. A water treatment system comprising:
   an ultraviolet bulb;
   water flow switch means for providing a signal indicative of whether water is flowing through said system;
   a transformer having a primary and a secondary electrically connected to said bulb;

an oscillator electrically connected to said transformer primary, said oscillator comprising a feedback oscillator electrically connected between said transformer secondary and said transformer primary; and a control means for controlling the frequency at which said oscillator operates, said control means operating said oscillator at a first frequency when said water flow switch means signal indicates that water is not flowing, said control means operating said oscillator at a second frequency when said water flow switch means signal indicates that water is flowing, said control means including a pair of compensators having first and second capacitances said control means further including compensator switch means for selectably electrically connecting one of said compensators between said transformer secondary and said bulb, said compensator switch means connecting said first compensator to said secondary when said water flow switch means signal indicates that water is not flowing, said compensator switch means connecting said second compensator to said secondary when said water flow switch means signal indicates that water is flowing.

7. A water treatment system as defined in claim 6 wherein each of said compensators comprises a capacitor.

8. A water treatment system as defined in claim 6 wherein said transformer comprises a center-tap transformer.

9. An electrical ballast system for a water treatment system having an ultraviolet bulb comprising:

a water flow indicator means for indicating water flow through said system;

a transformer having a primary and a secondary adapted to be connected to the bulb;

a feedback oscillator connected between said transformer primary and said transformer secondary; and variable capacitance compensator means connected to said transformer secondary for providing a selectable capacitance compensation to the bulb responsive to the water flow indicator means.

10. An electrical ballast as defined in claim 9 wherein said compensator means includes a pair of capacitors having relatively high and low capacitances and switch means for selectably connecting one of said capacitors between said transformer secondary and the bulb.

11. An electrical ballast as defined in claim 9 wherein said transformer comprises a center-tap transformer.

* * * * *

UNITED STATES PATENT AND TRADEMARK OFFICE
CERTIFICATE OF CORRECTION

PATENT NO. : 5,611,918
DATED : March 18, 1997
INVENTOR(S) : Ronald C. Markham

It is certified that error appears in the above-indentified patent and that said Letters Patent is hereby corrected as shown below:

Column 6, Claim 1, Line 4:
      After "comprising:" insert a paragraph

Column 6, Claim 1, Line 5:
      Delete "," and insert --;--

Column 6, Claim 2, Line 17:
      Delete "," and insert --;--

Signed and Sealed this

First Day of July, 1997

*Attest:*

BRUCE LEHMAN

*Attesting Officer*       *Commissioner of Patents and Trademarks*